US006550024B1

(12) United States Patent
Pagurek et al.

(10) Patent No.: US 6,550,024 B1
(45) Date of Patent: Apr. 15, 2003

(54) SEMANTIC ERROR DIAGNOSTIC PROCESS FOR MULTI-AGENT SYSTEMS

(75) Inventors: Bernard Pagurek, Nepean (CA); Daniel Choi, Ottawa (CA); Tom Gray, Carp (CA); Serge Manvoksi, Carp (CA)

(73) Assignee: Mitel Corporation, Kanata (CA)

( * ) Notice: Subject to any disclaimer, the term of this patent is extended or adjusted under 35 U.S.C. 154(b) by 0 days.

(21) Appl. No.: 09/497,305

(22) Filed: Feb. 3, 2000

(51) Int. Cl.[7] .................................................. G06F 11/60
(52) U.S. Cl. ................................................ 714/47; 714/4
(58) Field of Search .............................. 714/2, 3, 4, 25, 714/31, 37, 38, 47

(56) References Cited

U.S. PATENT DOCUMENTS

| 4,503,535 A | * | 3/1985 | Budde et al. ................. 714/47 |
| 5,331,642 A | | 7/1994 | Valley et al. |
| 5,339,261 A | * | 8/1994 | Adelson et al. ............... 714/47 |
| 5,404,503 A | * | 4/1995 | Hill et al. ..................... 714/31 |
| 5,539,877 A | | 7/1996 | Winokur et al. |
| 5,664,093 A | * | 9/1997 | Barnett et al. ................ 714/31 |
| 5,675,724 A | * | 10/1997 | Beal et al. ...................... 714/4 |
| 5,832,195 A | * | 11/1998 | Braun et al. ..................... 714/2 |
| 5,920,622 A | * | 7/1999 | Erb et al. ............... 379/204.01 |
| 5,941,992 A | * | 8/1999 | Croslin et al. ................. 714/4 |
| 6,205,561 B1 | * | 3/2001 | Santerre et al. ............... 714/36 |
| 6,205,562 B1 | * | 3/2001 | Fukushima et al. ........... 714/43 |
| 6,219,805 B1 | * | 4/2001 | Jones et al. ................... 714/38 |
| 6,324,162 B1 | * | 11/2001 | Chaudhuri ................... 370/225 |
| 6,327,669 B1 | * | 12/2001 | Croslin ........................... 714/4 |

OTHER PUBLICATIONS

Sundresh, T.S., "Semantic reliability in distributed AI systems", Systems, Man, and Cybernetics, 1999. IEEE SMC '99 Conference Proceedings. 1999 IEEE International Conference on, vol. 3, 1999 pp.: 798–803 vol. 3.*

* cited by examiner

Primary Examiner—Robert Beausoliel
Assistant Examiner—Gabriel Chu
(74) Attorney, Agent, or Firm—Keating & Bennett, LLP

(57) ABSTRACT

A method and apparatus for automatically locating sources of semantic error in a multi-agent system based on setup connection tree information, and informing the appropriate agents so that they can avoid using the faulty resources in the future. The setup connection tree model is established based on patterns of agent actions for expressing the logical relationship between available resources in the disjunctive normal form (d.n.f.). A table is used to record different sets of resources for use in the resource selection process. Thus, faulty resources can be located by means of induction. A global database is also maintained for updating information on semantic errors in the system.

14 Claims, 12 Drawing Sheets

| AppID | STBRecords |
|---|---|
| V01-S01-002 | AppID: V01-S01-002<br>Simplified Tree: [(root A1), .......]<br>Resource Table: [(^(R1)(R2)),(^(R2)(R3)) ...]<br>TablePointer: 0 |
| M02-S03-001 | ................ |
| ............... | ................ |

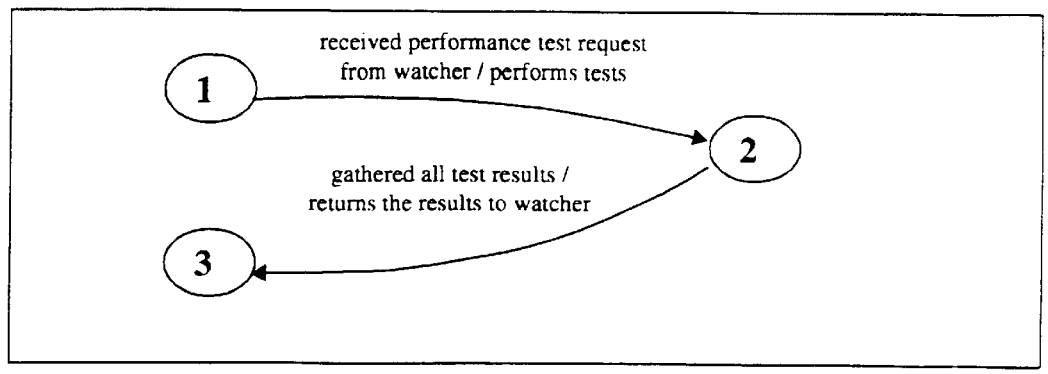
FIGURE 17
FIGURE 18
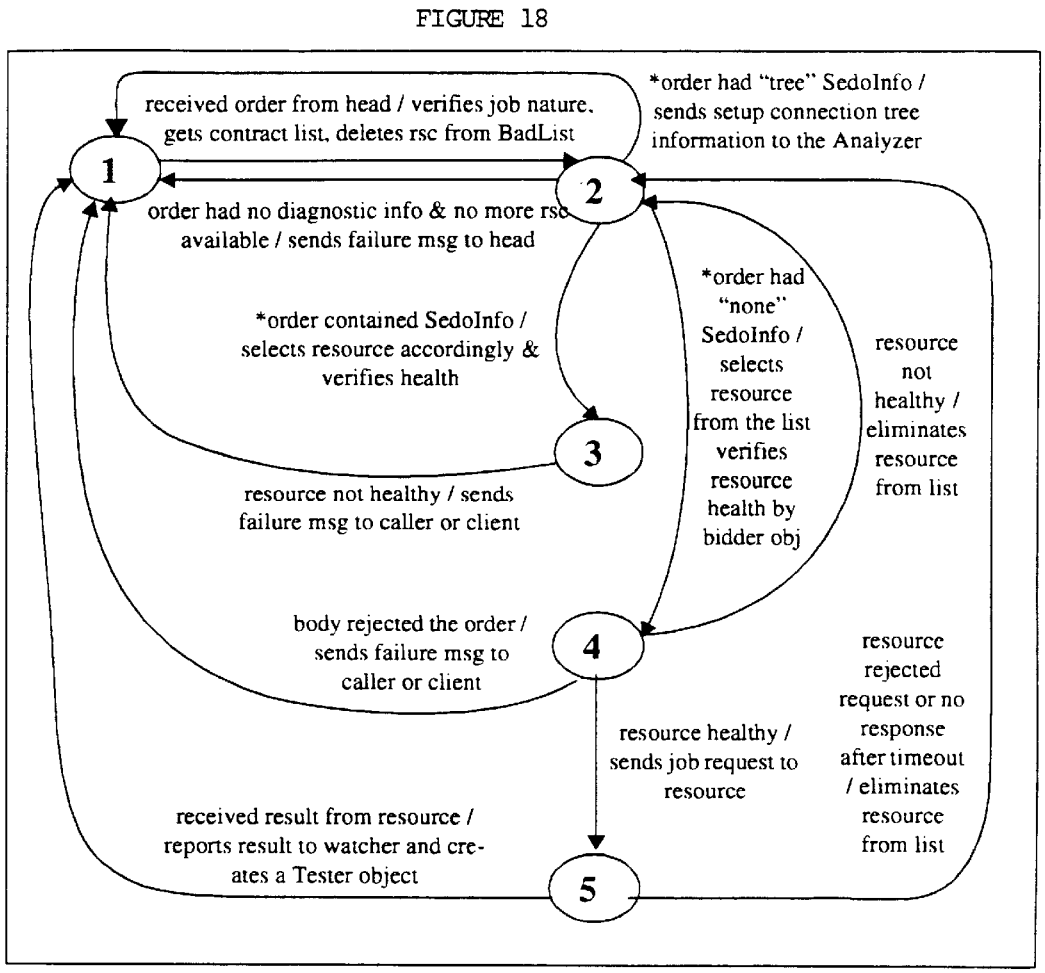

SEMANTIC ERROR DIAGNOSTIC PROCESS FOR MULTI-AGENT SYSTEMS

FIELD OF THE INVENTION

The present invention relates in general to multi-agent systems and more particularly to a fault localization algorithm for automatically solving semantic problems in multi-agent systems.

BACKGROUND OF THE INVENTION

Telecommunication systems have recently been designed for providing a variety of real-time services and features in an open distributed environment through the collaboration of a set of software components called agents. These multi-agent systems are designed in such a way that they may adapt and evolve in the face of changing environments. One such multi-agent system is known as MANA (Multi-Agent Architecture for Networking Applications) developed by Mitel Corporation. Through the use of a distributed agent architecture, this system meets high reliability levels and adapts to accommodate technological and service evolution. To achieve these goals, intelligence or learning mechanisms are provided to update service information derived from the operation of the agents. This information is used to redefine the agents and to reallocate resources for correcting failures and to meet the requirements of a defined service more precisely.

An application or service in a multi-agent system is mapped as a series of calls amongst agents to perform the service. Each agent specifies its type, quantity and quality of service (QoS) in order to provide for an overall application. Since multi-agent systems are implemented in an open environment, no agent has prior knowledge of any other agent. The only knowledge that an agent possesses is its requirements and capabilities to provide a specific type of service. Thus, an agent may be required to find other agents to fulfill certain of its service requirements. A calling agent (referred to herein as a contracting agent) sends out a bid for services to a plurality of called agents (referred to herein as contractor agents), each of whom may be capable of providing the necessary resources for the contracting agent to complete its task. The contracting agent receives and evaluates the bids from the various contractor agents and selects the agent which has the best chance of success in performing the requested service. A contract is said to have been made when a particular contractor agent has promised the contracting agent that it will provide its resources for a predetermined period of time. During system setup, the nature of services which are embedded in the agents is analyzed by a matching mechanism so that the system is able to recognize the connection of agents for future collaboration. This loose relationship existing between agents is referred to herein as understanding. The matching mechanism assigns all possible agents which can provide services (by checking templates residing in their scripts) for the agent based on the specification (format, content, etc.) of all predefined service requests. A script is stored in the head of an agent and contains a description of a specific job and a set of rules which control job behavior).

During the process of negotiation for a contract, the contracting agent provides job descriptions for the contractor agent and receives services from it. The contracting agent puts its trust in the contractor agent and only the application agent for the top contracting agent (the first calling agent that initiates the application, usually a helpdesk agent) has the requisite knowledge of itself to determine whether the result is successful based on overall performance. With this capability, performance failures of applications are discovered and handled at the semantic level of the application.

External resources connected to a multi-agent system may alter from time to time without notifying the system, for example as a result of technology innovation. In many cases, no problems are encountered in the system provided that the protocol between contracting and contractor agents is followed, as set forth above. However, in some circumstances, this protocol does not cover all changes to the system. For example, early dot matrix printers were capable of printing only text data files. Now, most printers employ either ink-jet or laser technology and provide a range of options to the user. The user cannot simply send a flat text file to a laser printer and expect the job to print because the default input format is in postscript. Instead, the laser printer requires additional details to be specified before the printing job can occur. In a multi-agent system with a held desk agent, a printer server agent, a file server and several printer resources, when the user wishes to print a document, he/she simply specifies the name of the data file and selects the appropriate print option at the help desk GUI (graphical user interface). The help desk agent passes the file name to the printer server agent which then obtains the data file from the file server and selects an available printer for the job. Before the advent of postscript, the protocol or agreement between the printer server agent and the printer resources were simple: any printer that was not busy would be selected and that printer would print the contents of the data file obtained from the file server agent. However, with the advent of laser printers and postscript format, an idle laser printer would not be capable of printing the flat text file since the postscript format requires certain fields which specify the file format. The printer would assume that it has received a postscript file since there has been no information specified in the file format field during system set up and therefore the print job fails. Nonetheless, the printer server agent assumes that the print job has been successful and the problem is discovered only after the printer output has been passed back to the help desk agent or to the client.

This type of failure is known as a semantic error. For the purposes of describing the present invention, a semantic error in a multi-agent system is defined as:

A fault that can only be discovered when the discrepancy of overall performance is detected by the application agent during the operation of an application.

Thus, semantic level errors occur at the top level of the agent connection hierarchy of an application, where the application agent resides. The semantic error may be caused by a hardware failure that cannot be detected by underlying agents (i.e. at the sintactic level) during operation, or due to a misunderstanding between agents during the application set up stage. The printer example set forth above is very simple. In the general case, semantic problems are more complicated due to the fact that a faulty resource may lead to semantic errors in some applications but work properly for others.

SUMMARY OF THE INVENTION

According to the present invention, a system is provided for automatically locating sources of semantic error in a multi-agent system based on setup connection tree information, and informing the appropriate agents so that they can avoid using the faulty resources in the future. The setup connection tree model is established based on patterns of agent actions for expressing the logical relationship between available resources in the disjunctive normal form (d.n.f.). A table is used to record different sets of resources for use in the resource selection process. Thus, faulty resources can be located by means of induction. A global database is also maintained (referred to herein as the SEDO Information Base (SIB), where SEDO stands for Semantic Error Diagnostic Operation), for updating information on semantic errors in the system. Thus, a system administrator can analyze the cause of semantic problems based on detailed information maintained in the SIB database.

BRIEF DESCRIPTION OF THE DRAWINGS

An embodiment of the invention is described herein below with reference to the accompanying drawings, in which:

FIG. 17 shows the behavior of a Tester object in the semantic error detection system of FIG. 4;

FIG. 18 shows the behavior of a modified Broker object in the application agent body, according to the invention;

DETAILED DESCRIPTION OF THE PREFERRED EMBODIMENT

Figure 1:
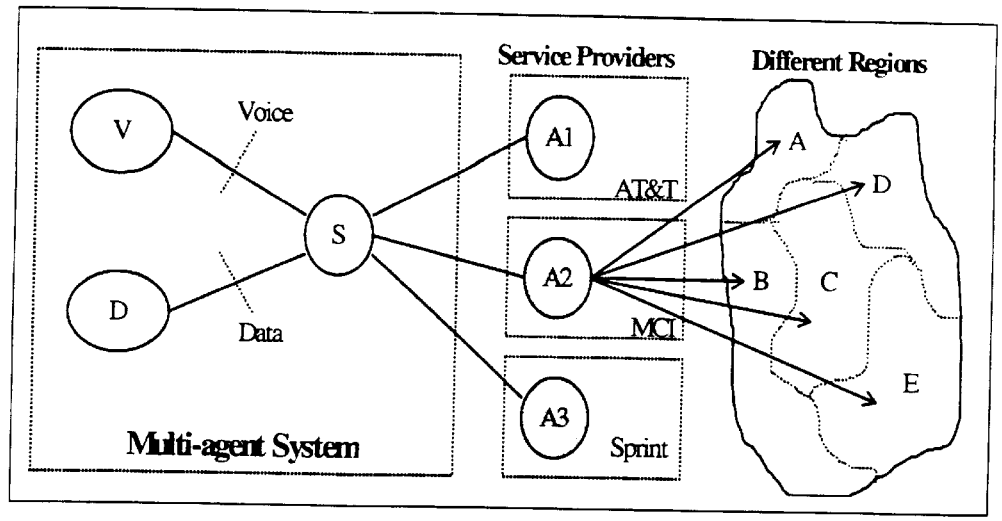
FIG. 1 is a schematic illustration of a long distance telephony service provided by an exemplary multi-agent system.

With reference to FIG. 1, an example of a long distance service application is provided to illustrate the problem of semantic errors in a multi-agent system.

In the service, an agent S., which functions as a service resource selector, suggests long distance service providers to a voice service helpdesk agent, V, which is responsible for supervising the services of all voice call applications. Agent V employs agent S as a service broker that connects to three resources. The resources are external agents (A1, A2, and A3) which belong to three different long distance service providers: AT&T, MCI and Sprint, respectively. All of these providers connect to the local telephone networks from different areas, for example from regions A to E. Since each of these long distance companies has its own charging schemes, agent S is set up with the appropriate knowledge of how to select the most appropriate service provider according to the time of day, destination of the receivers, price or quality based on past experience.

In the example of FIG. 1, it can be assumed that for voice traffic, the multiagent long distance service functions properly. Next, assume that a new helpdesk agent (agent D) is added to the system to provide services of modem data transfer. In a manner similar to agent V, the new agent D has an understanding with the agent S and can make contracts with agent S when a modem service is requested. Although, initially, the new service can be assumed to operate correctly, assume that the introduction of the new modem data transfer service to the system is not recognized by external agents (A1, A2 and A3) from their local viewpoints because the introduction of helpdesk agent D occurred after the system had been setup. These external agents cooperate with the system only through explicit guarantees in the contracts. Since the service on each side of the contract are not designed or tested together and may become altered at anytime without informing the other, the long distance service providers presume that all data streams received from the multi-agent system are voice traffic. Thus a semantic error may occur when there is any change to the system which may violate the understanding of one side of a contract. The fault scenario may unfold, for example, when the long distance service provider MCI (agent A2) decides to use compression for voice on its trunks voice traffic to region B (says Washington) during a certain period of time. The external change is transparent to all voice services because it had been particularly designed for voice data. Nevertheless, the compression for voice is not suitable for modem data. As a result, an extremely low data transmission rate is encountered whenever modem data is sent to or received from region B. The reason is that the compression on the trunks assumes that the signal will have a speech-like distribution. Since the modem data distribution is completely different from voice, such a compression causes the modem signal to be distorted upon receipt. In order to receive the signal with distortion, the modem at each side has to switch to a very low data transfer rate.

In this fault scenario, all of the agents may be assumed to work properly except that only agent D experiences failures occasionally.

This happens since at the system setup time (when the details of agreement between S and A2 were defined), agent D did not exist and the use of modem data was not contemplated. A2 would have guaranteed service only for voice traffic and it was free to change service as long as it still maintained service quality in the ontology of its existing voice contract with S. In this case, A2 had no responsibility to inform S of its change because it would not affect its guarantee to S. After D comes into existence it believes that it has been well serviced by S and its supplier A2 since the transmission requirements for data are not part of the ontology of the agreement between S and A2. Similar changes may happen at anytime because A2 is constantly managing its network to optimize its service and to overcome faults. Some other changes may also be made when features like loaded/unloaded trunks or echo suppression, etc. are added to voice traffic.

Figure 2:
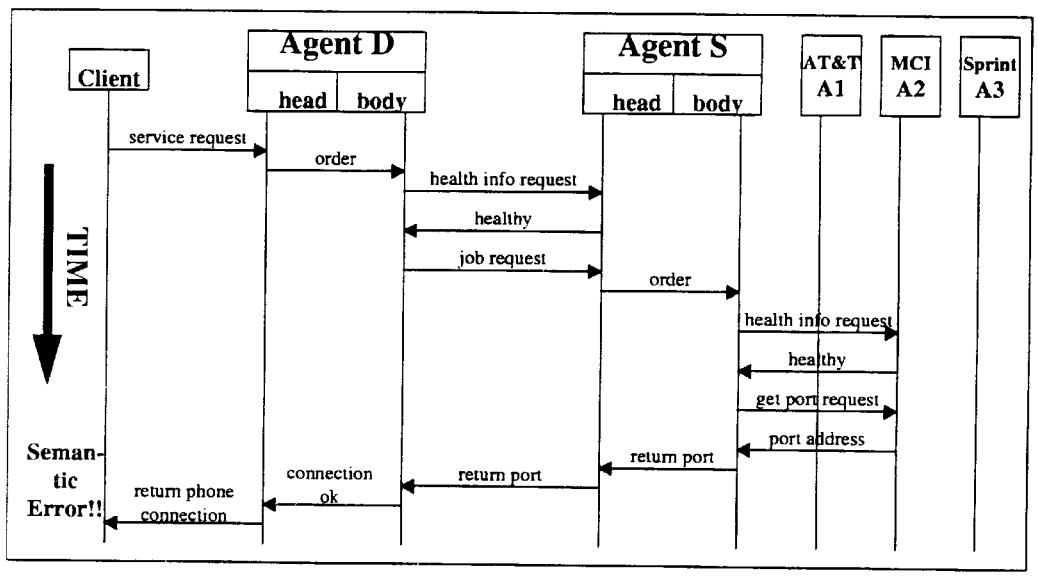
FIG. 2 is a message sequence chart showing messages exchanged between agents for the system of FIG. 1.

Turning to FIG. 2, a message sequence chart is provided showing an exchange of messages for the fault scenario discussed above with reference to FIG. 1. Agent V is not shown in FIG. 2 for simplicity as it is not involved in the fault scenario. There is no communication between agent V and agent D. In the successful scenario of a voice application, agent V is involved in a similar message sequence as agent D (i.e., D may be replaced by V in FIG. 2), except that the application is a successful one that does not encounter any semantic problem.

As discussed briefly above, the nature of a semantic fault is that it can only be recognized by the application agent. It is different from syntactic errors which are usually low-level problems caused by hardware failure or resources which are too busy to respond to a request before a timeout. Syntactic errors may occur during the application setup or operation. However, they can be detected and handled by neighboring agents. In contrast, semantic errors are faults discovered during the operation of an application and may be caused by a misunderstanding between network components or hardware failure of resources which cannot be detected by underlying agents. The fault scenario discussed above with reference to the long-distance service shown in FIG. 1 is an example of a misunderstanding between agents. Agent S has no means to verify the result of a contract because it is simply a broker selecting suitable resources. The selection of resources depends on the understanding relationship between S and the resources. This relationship is specified during system setup. Hence, agent S does not perform detailed tests to see which resource is capable of providing a completely satisfactory service before making a contract with it. Instead, it selects resources based on its understanding relationship with the agents. In addition, the only agent which possesses knowledge of the problem is the application agent (V or D) because it is the agent that established physical connection to the resources during operation. S only gets the port address of one of the resources and then passes it back to V or D. Performing local tests by S implies that S needs detailed information and a mechanism to set up a phone channel connected to the resources (A1, A2 or A3). It could then test the effective transmission rate by sending and receiving test data via the port in a manner similar to what the application agent does. However, this is not a practical solution in terms of cost and system complexity.

In order to solve semantic problems, a fault localization algorithm is provided according to the present invention to locate an agent or resource which is suspected of causing semantic errors so that the offending agent can be avoided in the future. When an application is executed after a successful setup, the application agent monitors the overall performance at the semantic level. It issues performance tests on the operation of the application and waits for the results. By examining the test results, it determines whether an application is a successful one or whether it has encountered a semantic problem. If the application is successfully set up in the beginning, the algorithm of the present invention does not need to provide any diagnostic action. Otherwise, the fault localization mechanism locates the semantic faulty resource. The inventive algorithm passes diagnostic information to all underlying agents involved in the application so that they can select an alternative resource when a similar application is set up on a subsequent occasion. However, that agent can also be chosen for other types of applications and will be rejected only by a specific type of application which has previously encountered the semantic error. The network administrator can also input some test cases with the same application nature to find out the erroneous resources. The faulty resource is not located until a similar application has passed all of the performance tests. Hence the resource chosen when the semantic problem still existed, which has just been replaced by a new resource that does not cause the semantic problem, is determined to be the faulty resource. The algorithm of the present invention does not investigate why the faulty resource has been a problem. Instead it allows the underlying agents to recognize the occurrence of semantic problems so that they can avoid the located faulty resources in future resource selection processes. To fix the faulty resource physically, a system administrator must gather information from the SEDO Information Base (SIB) to determine a repair strategy for the resource. This way, the system can remain in operation and at the same time the system administrator can analyze the problem.

Figure 3:
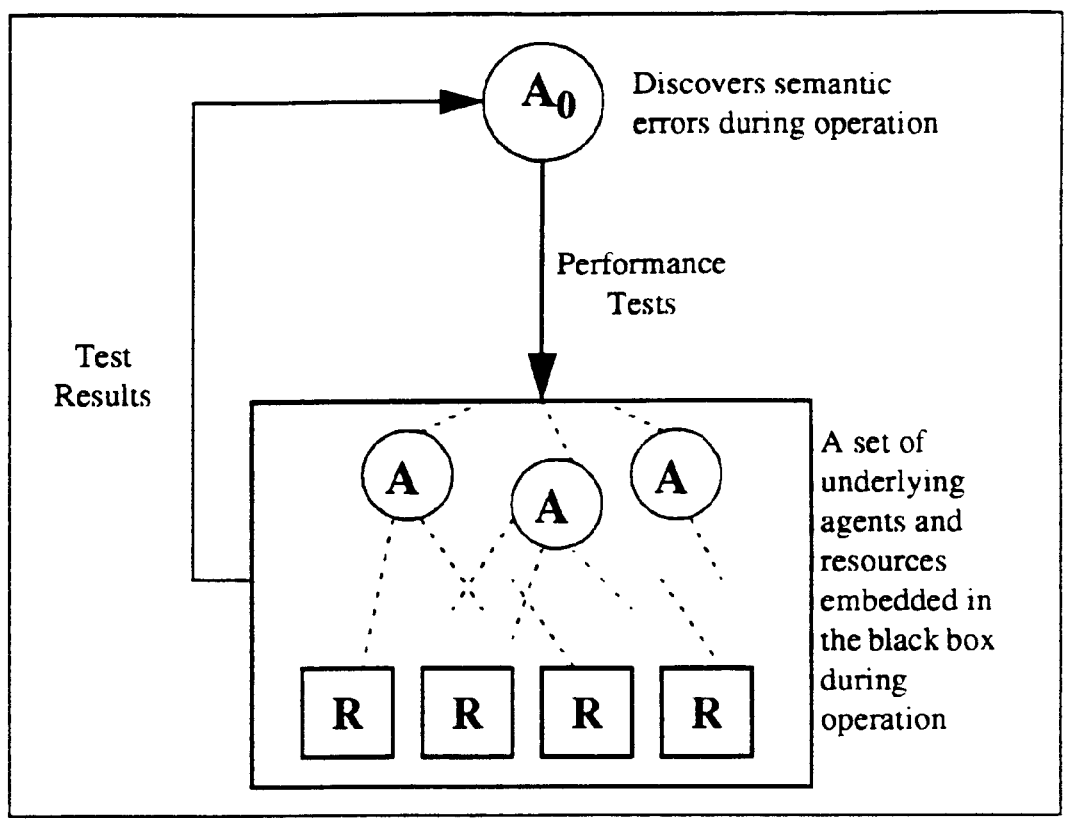
FIG. 3 is a simple semantic fault model for a multi-agent system.

In order to explain the details of operation of the present invention, a simple model of a semantic error is set forth, in the context of an exemplary multi-agent system, with reference to FIG. 3.

The illustrated model shows how semantic errors may be detected by an application agent during the operation of an application. In this model, $A_0$ is the application agent that initiates an application, performs tests and determines whether the application has encountered a semantic problem. There is at least one resource R that is the resource selected by an underlying agent A during application setup. Additional underlying agents A may be involved in both the application setup and operation stages. The model presumes that $A_0$ has some means of testing the performance of the application. For example, $A_0$ may have a physical connection to a resource so that it can test the effective data transfer rate between the resource and itself. However, $A_o$ does not know details such as the location or identity of the resource since the connection between $A_0$ and the resource has been established by some underlying agents (which may not be involved in the operation) during application setup. The underlying agents and resources are all hidden in a 'black box' by the local view of $A_0$.

Figure 4:
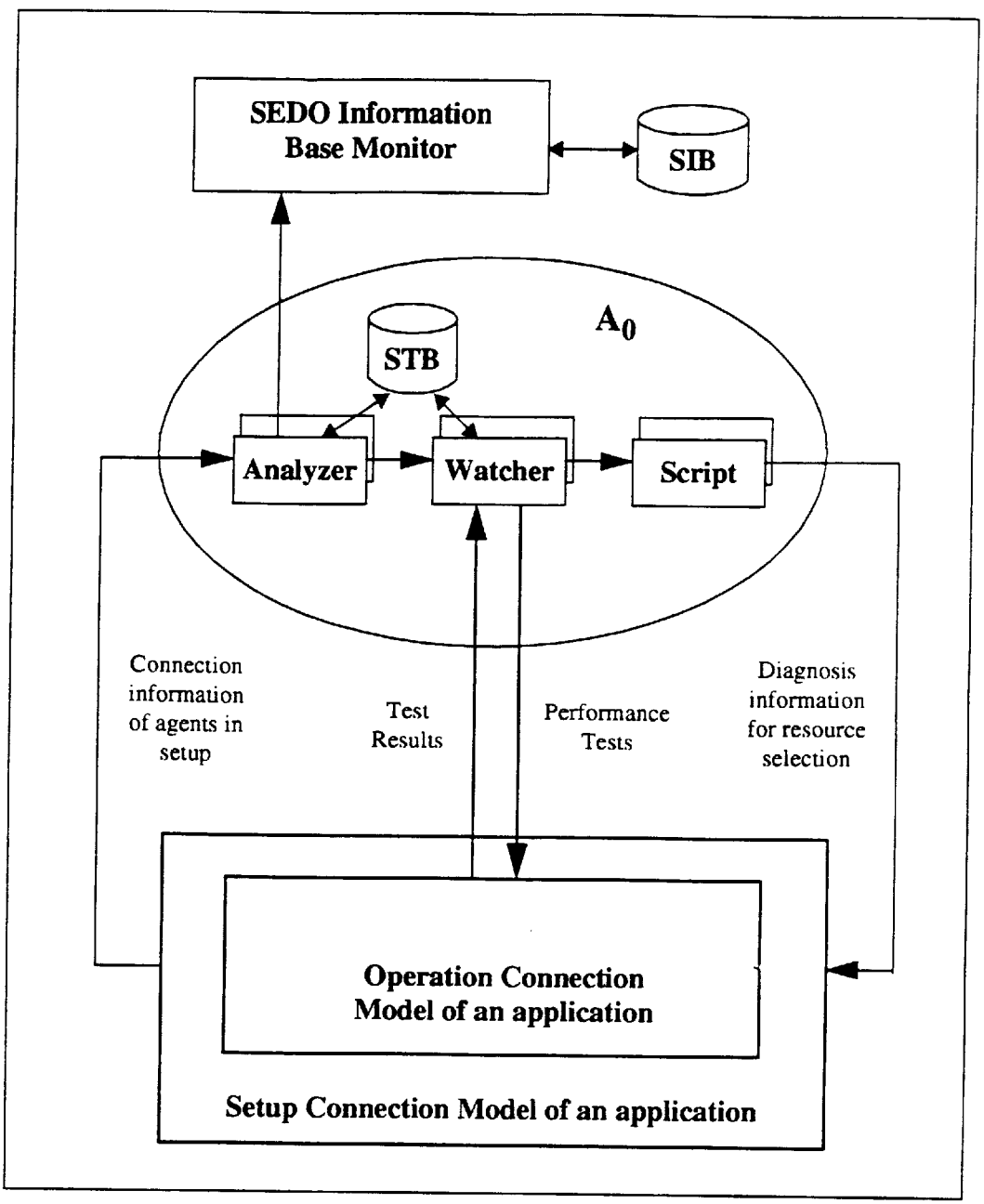
FIG. 4 is a diagnosis model of a semantic error detection system, according to the present invention.

FIG. 4 is a diagnosis model of the semantic error detection system according to the present invention. $A_0$ is the application agent. In the head of $A_0$, there are analyzers, watchers, scripts and a SEDO Temporary Base (STB). The analyzers, watchers and STB exist only in the application agent. An analyzer gathers information concerning resource connection during application setup and generates diagnostic information. A watcher defines and assigns an identity for the application (the AppID) in order to distinguish which application a piece of information belongs to. It also monitors the overall performance of an application by issuing performance tests and verifying the results so that it can provide diagnostic information for the script. Scripts inside an agent receive job requests and send orders to the body of the agent. STB is a local repository inside an application agent and its function is to store temporary diagnostic information for the application. All of the foregoing components, except the STB, are rule-based expert system scripts which, according to the preferred embodiment, are written in JESS (Java Expert System Shell).

The SEDO Information Base (SIB) is a global database that stores detailed information concerning all semantic errors encountered in the application. The SIB is managed by a SIB Monitor which provides input/output (I/O) interfaces as well as graphical user interface (GUI) for accessing the SIB.

The application agent $A_0$ communicates with underlying agents and resources which, as discussed above, may be represented by a tree hierarchy. Diagnostic information for resource selection is sent to agents represented by the possible agent/resource connections of application setup and connection information is received therefrom. Performance tests and test results are exchanged between the application $A_0$ and the actual physical agent/resource connections during the operation of the application. The operation connection model is an extraction of the setup connection model since the agents/resources connected in the model are those involved in the application setup. The setup connection model of agents/resources provides important information for the analyzer and it is established by the connection of agents/resources according to the pattern of agent actions.

Figure 5:
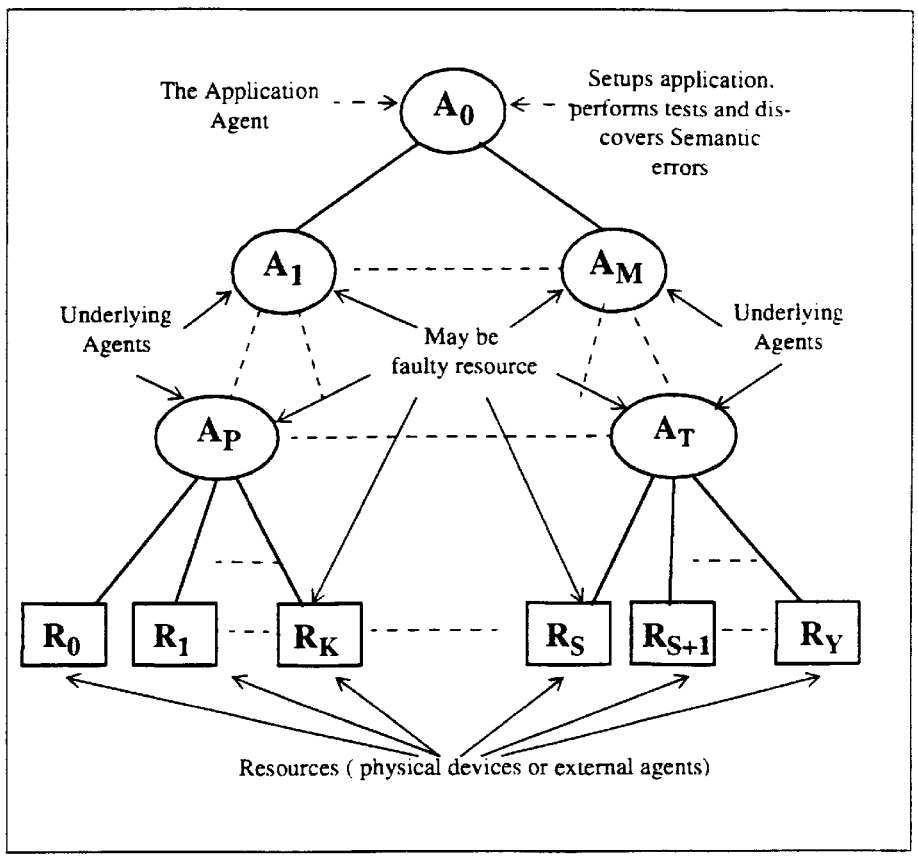
FIG. 5 shows a general physical agent/resource connection model.

A more general physical agent/resource connection model for the system of FIG. 4 is shown in FIG. 5 represented by a tree hierarchy. In the diagram, agents $A_N$ are connected either directly, or via underlying agents to the resources $R_i$ (i>=0), where M,P,T,K,S and Y are integers greater than 0 (T>P>M>1 and Y>S>K >1). The value of N increases according to the position of an agent from top to bottom and left to right. For example, the application agent at the top level (level 0) is $A_0$, the left most agent in the adjacent lower level (level 1) is $A_0$, and the adjacent agent to the right at the same level is $A_2$ and so on. Similarly, the value of i increases from left to right so that the left-most resource in the tree diagram is $R_0$, the next one to the right is $R_1$ and so on regardless of level. An application may employ more than one agent or resource. $A_0$ initiates the application, issues performance tests and detects semantic errors. In this model, $A_0$ is assumed to be error-free. Other agents or resources, however, may cause semantic problems in operation.

FIG. 5 is only a general physical connection model among agents and resources. However, it is not detailed enough to reflect the behavior of an application. Application behavior is represented by the complicated agent actions from which the setup connection model is established. The semantic error detection system of the present invention recognizes four patterns of agent action: XOR, AND, ORDER and LOOP. The first three patterns are known in the art (see M. Barbuceanu, "How to Make Your Agents Fulfil Their Obligations", Proceedings of PAAM-98, London, England, 1998: http://www.ie.utoronto.ca/EIL/ABS-page/paam 98.ps), having been described using simple action language introduced that uses different terms to describe the patterns namely, Choice (XOR), Parallel (AND) and Sequences (ORDER). The agents involved during the application setup are connected together physically and logically by these actions. Hence the agent/resource connection model of application setup may be represented by a tree of agents and resources which are connected and related by these patterns, as shown in FIGS. 6–8.

Figure 6:
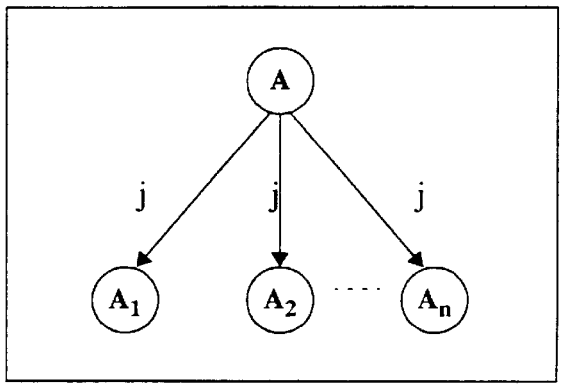
FIG. 6 is a representation of an XOR action between agents for the model of FIG. 5.

The pattern of the XOR agent action is shown in FIG. 6. During application setup, A gets information from the policy object and identifies the most suitable resources it can employ. In this pattern agent A finds more than one agent $A_1$, $A_2$, . . . and $A_n$ which is capable of doing the same job, but only one agent is chosen. A then issues a job request j to that agent. The role of A is that of a broker which is responsible for selecting resources according to application requirements. The selector agent S in FIG. 1 is an example of this pattern.

Figure 7:
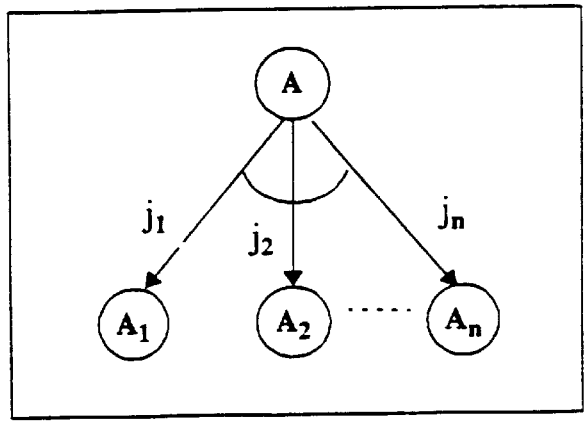
FIG. 7 is a representation of an AND action between agents for the model of FIG. 5.
Figure 8:
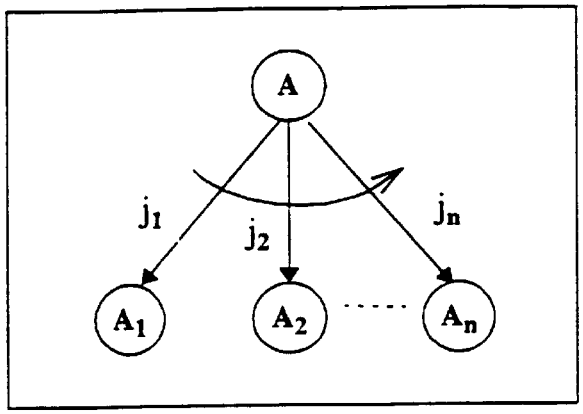
FIG. 8 is a representation of an ORDER action between agents for the model of FIG. 5.

The AND agent action is shown in FIG. 7. In this pattern, agent A employs all of its underlying agents $A_1$, $A_2$, . . . and $A_n$. The operation of a connection between A and one of these underlying agents may be parallel with one another. The job requests to the underlying agents may be the same or different from each other. For example, an agent may issue a request for printing jobs from all available printers to print more than one copy of the same document. On the other hand, an agent may gather the results of different job requests from its underlying agents and pass them back to its calling agent. The ORDER agent action is shown in FIG. 8.

Similar to the AND pattern, agent A employs all of its underlying agents $A_1$, $A_2$, . . . and $A_n$. However, the operation of connection path runs in order. The operation of path $A-A_2$ does not start until path $A-A_1$ has finished its operation and returned a result. Similarly, path $A-A_3$ starts only when path $A-A_2$ has finished its operation and returned its results, and so on. Again, the job requests to the underlying agents may be the same or different from each other. The printer server agent discussed above under the heading "Background of the Invention", is an example of this pattern. The printer server agent has to retrieve the whole data file from the file server before it can ask for a printing job from the printers.

Figure 9:
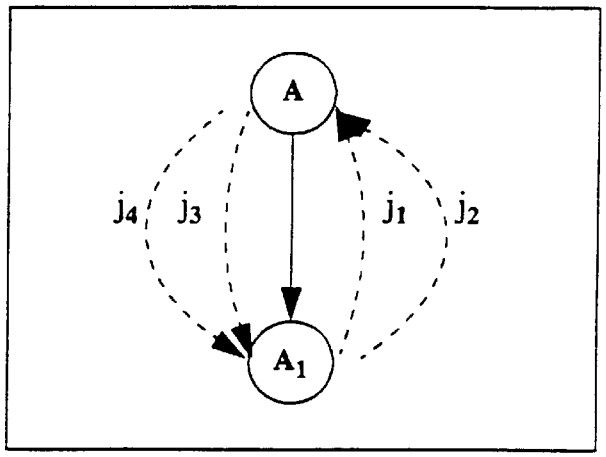
FIG. 9 is a representation of a LOOP action between agents for the model of FIG. 5.

The sequence of agent actions in a LOOP pattern are completely hidden from the topology of agent connection so as to be 'invisible' from a physical connection viewpoint. FIG. 9 shows a LOOP pattern formed by two agents. It should be noted that the 'loops' shown in this pattern are not erroneous infinite loops, but merely a course of different job requests between two agents. Thus, if A has the capability to do jobs $j_1$ and $j_2$ while $A_1$ can do jobs $j_3$ and $j_4$, and the task of an application is to do $j_1$, and assuming that $j_1$ requires the outcome from $j_3$, and $j_3$ in turns needs the result from $j_2$ in order to finish the job, then from an agent connection viewpoint, A will ask $A_1$ to provide service and $A_1$ will also ask A to provide service such that there is an apparent 'loop' between the two agents. However, from a sequence viewpoint, it is merely a straight sequence of individual job execution (i.e., a superset of a physical connection model) for an exemplary application agent $A_0$ which issues requests for both jobs $j_1$ and $j_2$ from $A_1$ and $A_2$ respectively (the AND pattern) during application setup. $A_1$ in turn requests job j3 from A3 and so on. There is a LOOP pattern between $A_1$ and $A_3$ and an ORDER pattern between resource $R_4$ ($j_7$) and agent $A_4$ ($j_7$). Other agents are connected according to the XOR pattern. Thus, the connection model of FIG. 9 not only shows the physical connection among agents/resources but also their logical relationships.

Figure 10:
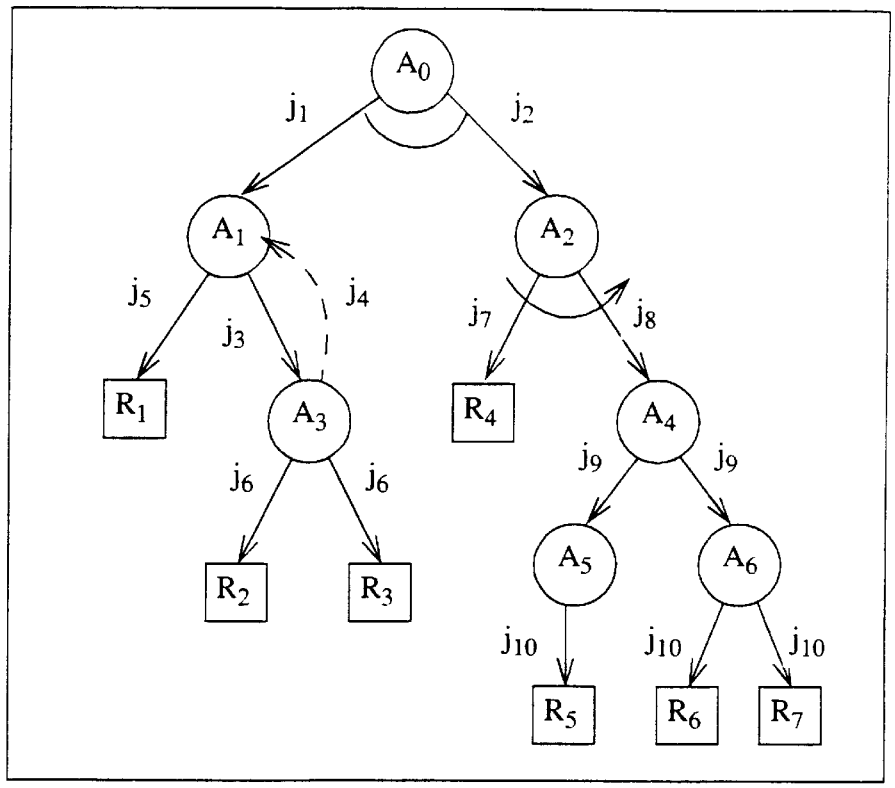
FIG. 10 shows an example of an application setup connection model.
Figure 11:
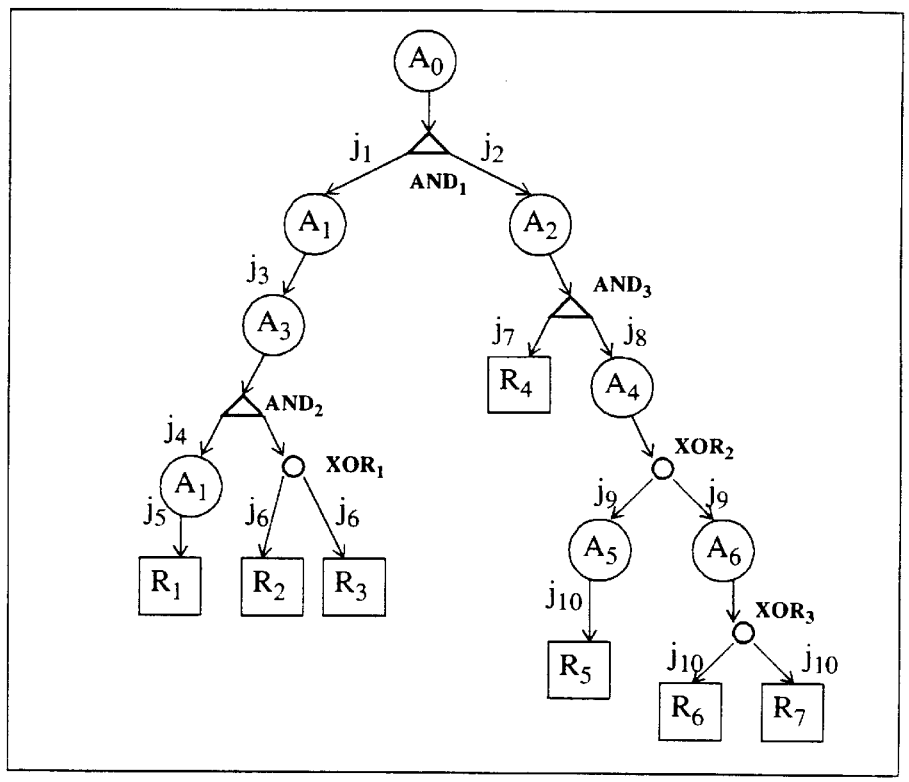
FIG. 11 is a simplified setup connection model based on the model of FIG. 10, according to the present invention.

According to the present invention, the setup connection model of FIG. 10 is simplified to form a diagnosis model as shown in FIG. 11. The LOOP pattern in FIG. 10 is deconstructed in FIG. 11 as a sequence of jobs. In addition, according to the diagnosis model of FIG. 10, there is no difference between the representation of the AND pattern and the ORDER pattern. The sequence of the agent actions is trivial in the diagnostic model since the system of the present invention merely requires knowledge of how A will connect to the underlying resources at a high level viewpoint so that all resources with the ORDER pattern are eventually used, such as with the AND pattern. As a result, only the XOR and the AND agent action patterns are highlighted in the simplified tree of FIG. 11. In the case of an OR (inclusive) function, the representation used to illustrate the invention combines XOR and AND patterns in order to represent the relationship. For example, an agent may use resource A, or B, or both A and B, so it is expressed as A XOR B XOR (A AND B). In the hierarchy tree of FIG. 11, the small triangular symbols represent AND nodes among agents. They are labeled 'ANDx' (where x is a number). Similarly, the small circles labeled 'XORx' are the XOR nodes that represent the XOR pattern between agents.

The simplified tree information is supplied by the agents in the format of expert system facts for input to the analyzer of FIG. 4. In a rule-based expert system, facts are used as pre-conditions of rules and trigger rules. When all the facts required by a rule have been asserted into the expert system, the rule will be fired. The analyzer shown in FIG. 4 is basically a rule-based expert system that waits and receives the setup connection tree information and asserts it as facts. The analysis process starts after the analyzer has received all facts and the final result of the application. The following are only some of the facts representing the tree in FIG. 11:

(root A0): A0 is the root of tree, i.e. the application agent
(node Agent A1): A1 is an agent node
(node Rsc R1): R1 is a resource node
(node AND1 j1 j2): AND1 is a "AND node" that requires both results of jobs j1 and j2
(note XOR1 J6 j6): XOR1 is a 'OR node' that requires a result of job j6 from either one of the two possible j6 connections
(connect A1 A3 j3): A1 connects to A3 and needs A3 to return job j3 result
(connect AND1 A1 J1): AND1 connects to A1 and needs A1 to return job j1 result An agent knows which connecting agents or resources to choose in an application so that it can send information to the analyzer. However, an agent will do so only if the application has no 'bad record', (i.e. a new application or a 'healthy' application which may have encountered semantic errors before but has been 'fixed'). During the setup of an application, the application agent checks for diagnostic information stored in the SEDO Temporary Base (STB), to see whether or not an application has encountered semantic errors or not in the past. If the application had a semantic problem before and the source of problem has not yet been located, diagnostic information of the application should already exist in the STB. The application agent passes the information to the underlying agents along with the job requests. Otherwise the application agent merely passes a test string "none" to indicate that the application is a new one and thus the underlying agents send connection information to the analyzer.

Consider the case of a LOOP pattern from the previous example, the following are some facts of the setup tree connection information from the left subtree in FIG. 11:

```
Fact 1 => (connect AND1 A1 j1)     ; AND1 connects to A1
Fact 2 => (connect A1 A3 j3)       ; A1 connects to A3
Fact 3 => (connect A3 AND2 link)   ; A3 connects to AND2
Fact 4 => (connect AND2 A1 j4)     ; AND2 connects to A1
Fact 5 => (connect A1 R1 j5)       ; A1 connects to R1
```

The facts above are listed in order according to the figure. However, the analyzer has no knowledge about how they actually connect to each other upon receiving these facts. The facts may not be received in the order shown above at the analyzer side such that the analyzer may have a wrong interpretation of the connection geometry, for instance if fact 5 is received prior to facts 3 and 4:

```
Fact 1 => (connect AND1 A1 j1)     ; AND1 connects to A1
Fact 2 => (connect A1 A3 j3)       ; A1 connects to A3
Fact 5 => (connect A1 R1 j5)       ; A1 connects to R1
Fact 3 => (connect A3 AND2 link)   ; A3 connects to AND2
Fact 4 => (connect AND2 A1 j4)     ; AND2 connects to A1
```

Figure 12:
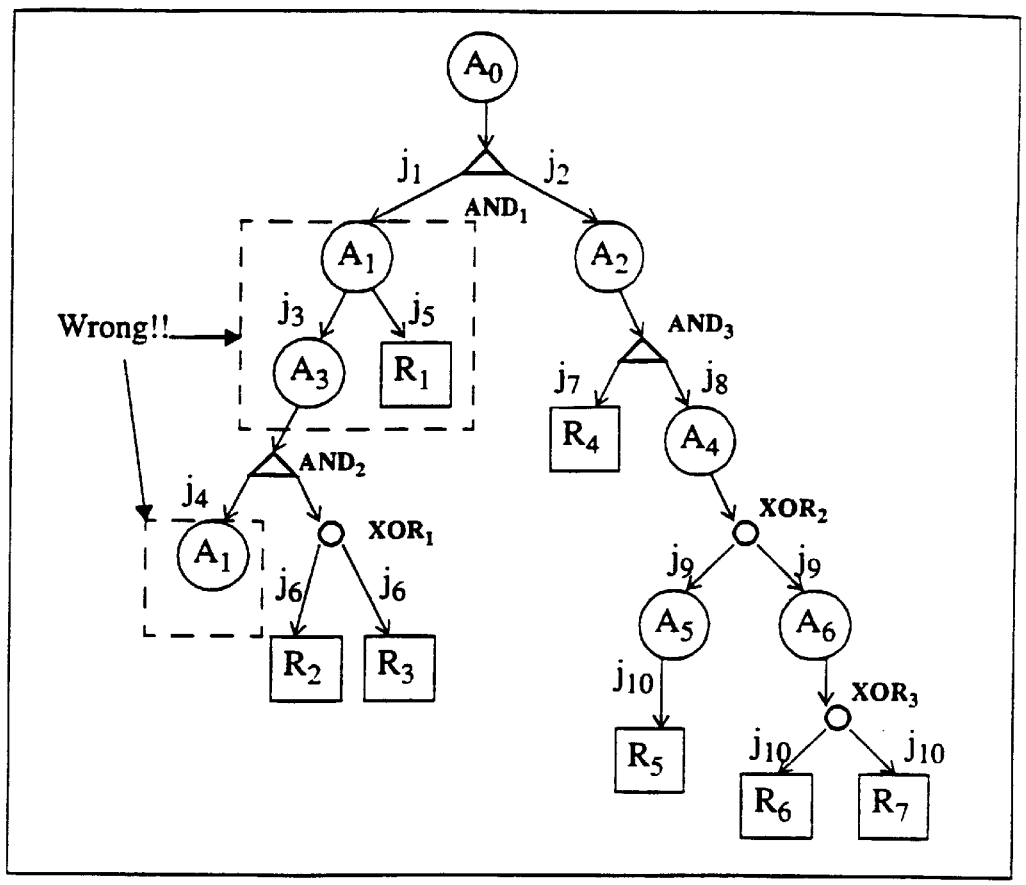
FIG. 12 shows an example of an incorrect interpretation of the simplified connection tree of FIG. 11.

In this case, the analyzer will misunderstand and generate incorrect diagnostic information as shown in FIG. 12.

The misinterpreted information may lead to unexpected results in the semantic error detection system of the invention. In order to avoid such a problem, a list, referred to herein as CallList, is passed from one agent to another along with the request message. The purpose of this list is to record which agent has been called during the chain of job requests. If the same agent is seen to be employed more than once, such as the agent A1 in the example of FIG. 12, the underlying agents will know from the list that the agent has been previously called. Thus other agents will simply add an index number after the original ID of that agent to make it look like another new agent. If the original ID of the agent is A1, the new ID representing the agent in the facts will be A1##01 the second time it is called and then A1##02, A1##03, etc. In the previous example, the list of facts to be sent to the analyzer becomes:

```
Fact 1 => (connect AND1 A1 j1)          ; AND1 connects to A1
Fact 2 => (connect A1 A3 j3)            ; A1 connects to A3
Fact 3 => (connect A3 AND2 link)        ; A3 connects to AND2
Fact 4 => (connect AND2 A1##01 j4)      ; AND2 connects to A1
                                          ($2^{nd}$ time)
Fact 5 => (connect A1##01 R1 j5)        ; A1 ($2^{nd}$ time) connects to R1
```

Hence the problem of misinterpretation of the setup connection tree is thereby overcome. The index added to the ID can also be used as a counter to check for a potential erroneous infinite loop.

The purpose of the analyzer is to accept the simplified setup connection tree information from the underlying agents and then generate diagnostic information to help locate the source of a semantic error. An analyzer object is created and associated with a watcher when the watcher is initialized during system setup (see FIG. 4). After setup, the analyzer waits for a message that contains a piece of information referred to as AppID. The AppID is an identity to distinguish different types of applications and is discussed in greater detail below. The location of the analyzer is hidden from other agents; however the agents send the AppID along with tree information so that the analyzer can retrieve correct tree information by matching the same AppID. The analyzer only accepts the setup tree information based on the same AppID that has been assigned to it so that tree information from different applications will not confuse the analyzer. After receiving the simplified setup connection tree information, the next step performed by the analyzer is to wait for the final result of the application. The watcher in the application agent verifies the application to see if a semantic error has been found. If notification of a semantic error is received, the analyzer starts the analysis process, as set forth below.

There are three procedures in the analysis process of the present invention; reduction, transformation and table generation.

Figure 13:
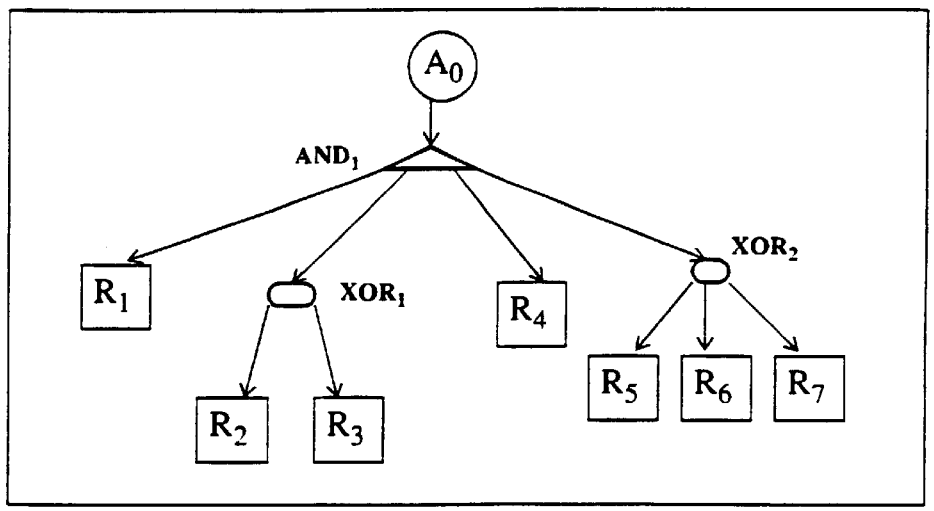
FIG. 13 shows a reduced connection tree diagram for the model of FIG. 11, according to the present invention.

The reduction process reduces the simplified tree so that only the logical relationship between the application agent and the underlying resources is highlighted. As a result, all of the underlying agent nodes present in the simplified tree are eliminated. In addition, any two relational nodes (AND or XOR) with the same pattern connected in sequence are merged together. The reduced tree of FIG. 11 is shown in FIG. 13.

The reduced tree, as represented by facts, is understood only by the expert system. In order to allow the transformation function (discussed in greater detail below) to work, it must be translated into a logical expression. For example, the AND pattern of two nodes N1 and N2 is represented as $(\char`\^(N_1)(N_2))$ where '^' is the AND symbol. Similarly the XOR symbol is '|'. The logical expression f derived from the reduced tree in FIG. 13 is:

f=(^(R1) (|(R2) (R3) (R4) (|R5) (R6) (R7)))

The reduction process is operated by a set of rules implemented in a script referred to herein as 'analysis.clp', the contents of which are reproduced hereinafter as part A of the attached Appendix.

The next procedure in the algorithm according to the present invention is the transformation of the reduced list. Since the transformation function according to the preferred embodiment is written in Java, it does not accept facts as input arguments. Thus, the reduced tree set forth herein above is translated into a logical expression. The purpose of the transformation step of the present invention is to transform the logical expression of the reduced tree into the disjunctive normal form (d.n.f.). The disjunctive normal form (d.n.f.) for logical expression is known in the art (see, for example, R. P. Grimaldi, "Disjunctive and Conjunctive Normal Form", Discrete and Combinatorial Mathematics—An Applied Introduction, $2^{nd}$ Edition, Addison Wesley, USA, pp. 595, 1989). Basically, the d.n.f. is a representation of f as the disjunction of fundamental conjunctions except that the disjunction is exclusive:

f=(|(rs0) (rs1) . . . (rsm)); rs=a set of resources

And each resource set (rs) is a fundamental conjunction of resources (rsc):

Rsi=(^(rsca) (rscb) . . . (rscn))

Figures 14, 15:
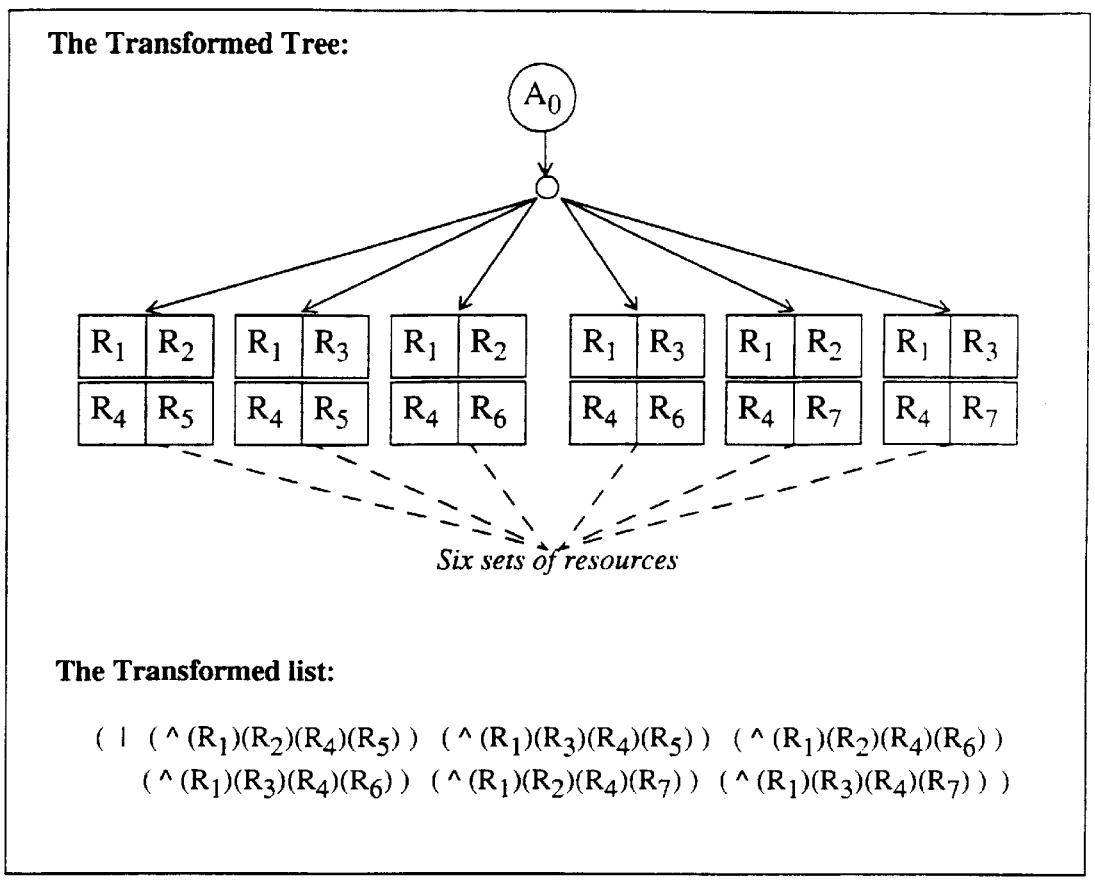
FIG. 14 shows a transformed tree for the reduced connection tree of FIG. 13 translated into a logical expression in disjunctive normal form, according to the invention.
FIG. 15 shows the structure of an STB database in the semantic error detection system of FIG. 4.

As a result, the transformed tree represented by the new d.n.f. expression has only the application agent remaining at the top level that connects to all available resource sets. There are only two levels in the tree hierarchy where level 0 (the top level) is the application agent and level 1 (the bottom level) is a number of resource sets which are related by the XOR pattern (exclusive disjunction). The resources within the same set are related by the AND pattern (conjunction). Accordingly, the transformed tree and list of FIG. 13 is shown in FIG. 14.

The transformation function is a Java recursive function that searches and transforms the tree by applying the following rules:

Rule #1: Conversion from AND to XOR
 (^(|(rsc__x) (subtree__1)) (subtree__2))=>(|(^(rsc__x) (subtree__2)) (^(subtree__1) (subtree__2)))

Rule #2: Merge of XORs
 (|(|(subtree__1) . . . (subtree__m)) (subtree__n))=>(| (subtree__1) . . . (subtree__m) (subtree__n))

A 'subtree' may be a resource or an expression. The second rule is applied at all levels except level 0 (the application agent). By applying the two rules, a transformed tree is expressed in the d.n.f. The interface of the function, '(transformed-list<reduced-list>)' is provided as a function call in the script 'analysis.clp' set forth above and the actual implementation is embedded in the function 'transform' of the class 'TransformListFunction', the contents of which are reproduced hereinafter as part B of the attached Appendix.

The final step of the analysis process according to the present invention is table generation. The analyzer uses the transformed list to generate a table for diagnostic purposes. Each set of resources shown in the transformed tree represents a possible combination of the resources which can be selected during application setup. A table is generated from this information in which each resource set is inserted as a row of the table. These rows are then arranged in an order such that there is only one different resource between two neighboring rows. Each resource set in FIG. 14 is mapped into Table A:

TABLE A

| Row (Set #) | Resources |
|---|---|
| 1 | R1, R2, R4, R5 |
| 2 | R1, R3, R4, R5 |
| 3 | R1, R3, R4, R6 |
| 4 | R1, R2, R4, R6 |
| 5 | R1, R2, R4, R7 |
| 6 | R1, R3, R4, R7 |

This table is stored as a piece of diagnostic information in the STB for future resource selection strategy. The interface for the function that generates the table is:

'(generate-table-from<transformed-list><initial-rsc-set><AppID><reduced-list>)' in the 'analysis.clp' script. The function is 'genTable' in class 'GenerateTableFunction', the contents of which are reproduced hereinafter as part C of the attached Appendix.

The SEDO Temporary Base (STB) is a local information repository that only resides in the head of an application agent. Upon receiving the notification of a semantic error, the analyzer starts the analysis process, resulting in storage of the simplified tree information as well as the table into the STB. The watcher then retrieves this information from the repository in order to perform semantic fault localization.

The STB stores information as key-value pairs in a manner similar to a hashtable. It uses the application identity (AppID) as a key and the STBRecord objects as the values associated with the key. AppID is generated by the watcher that specifies a group of applications with the same nature. The level of likeness can be adjusted within the watcher. The generation of AppIDs is explained in greater detail below. Each STBRecord contains fields to store information such as the AppID, the simplified tree, the table of an application as well as a table pointer initialized to 0 (pointing to the first row of the table, initially). FIG. 15 shows the structure of a STB.

As discussed briefly, above, the watcher is a rule-based expert system script written in JESS. It only resides in the head of an application agent. Its job is to generate an application identity (AppID), issue performance tests to verify the occurrence of semantic problems, trigger the analysis process in the analyzer and send diagnostic information to the underlying agents in order to locate the source of a semantic problem.

In order to issue performance tests, the application agent utilizes predetermined methods to check all of the required quality of service of an application so that it can determine whether a requirement has been satisfied or not. The watcher simply specifies the required test conditions and sends out test requests. A performance test as understood herein is described by a keyword, a conditional symbol and a threshold. A keyword is usually the name of a quality such as "TransferRate' or 'Bandwidth', etc . . . A conditional symbol is either '>' (greater than), '<' (less than) or '=' (equals). The threshold is a numerical value. For example, a performance test for a modem data transfer service may be 'TransferRate>14.39' and the Tester object in the body will return a result 'pass' if the modem data transfer rate is greater than 14.39 kbit/sec. There may be more than one performance test for an application. If not all of the results received from the Tester object are a 'pass', a semantic error is deemed to have been detected by the watcher. As a results, the watcher sends notification to the analyzer to start the analysis process. Diagnostic information can then be generated and stored in the STB, as set forth above.

The use of the application identity (AppID) is essential to the retrieval of diagnostic information. All of the applications which have the same nature and properties share a unique AppID. An AppID can also be used as a message identity to distinguish the messages from different applications. An AppID is generated by combining the agent identity (agent ID), the script object identity (script ID) and a number that represents a row in the AppID table storing detailed description of the application. The level of detail can be adjusted in the watcher so that different applications can be categorized accordingly. For example, in a long-distance call service, the area code can be used as part of the information to generate the AppID so that all long-distance service to the same area will have the same AppID. For instance, consider the scenario set forth in Table B involving seven phone call applications:

applications and not merely a single unique application. Thus, a reduced string representation of the first application becomes:

'VoiceCallAgent_1-001-Type^long_distance-AreaCode^416' or

'VoiceCallAgent_1-001-Type^long_distance'

The first string implies that all applications for the long distance voice phone call service with an area code 416 share the same AppID. The other string is more general for all long distance voice phone call services regardless of the area codes or the phone numbers.

A local AppID table in the watcher records these string as data and assigns an ID for each string. The ID becomes the AppID of the group of applications represented by the string and each AppID has the following form:

AgentID-ScriptID-N

Where N is an integer greater than or equal to 0 that represents the row number of the AppID table. The AppIDs generated from the applications in the previous examples hence become 'VoiceCallAgent_1-001-0' and 'VoiceCallAgent_1-001-1' respectively. The local AppID table is a hashtable that uses the AppID as a key to store the corresponding details of an application. There are two pieces of information in each row of the AppID table: an AppID and the details of an application expressed as a string.

Figure 16:
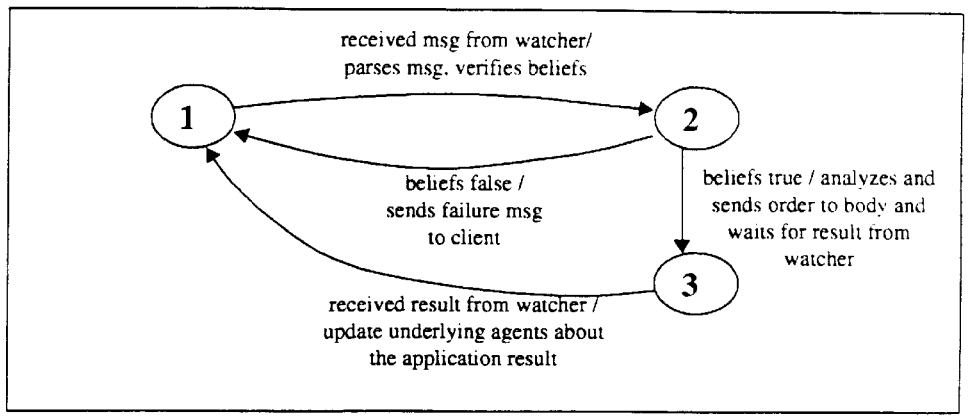
FIGS. 16(a) and 16(b) show the behavior of a modified script and watcher, respectively, in the semantic error detection system of FIG. 4.
Figure 16:
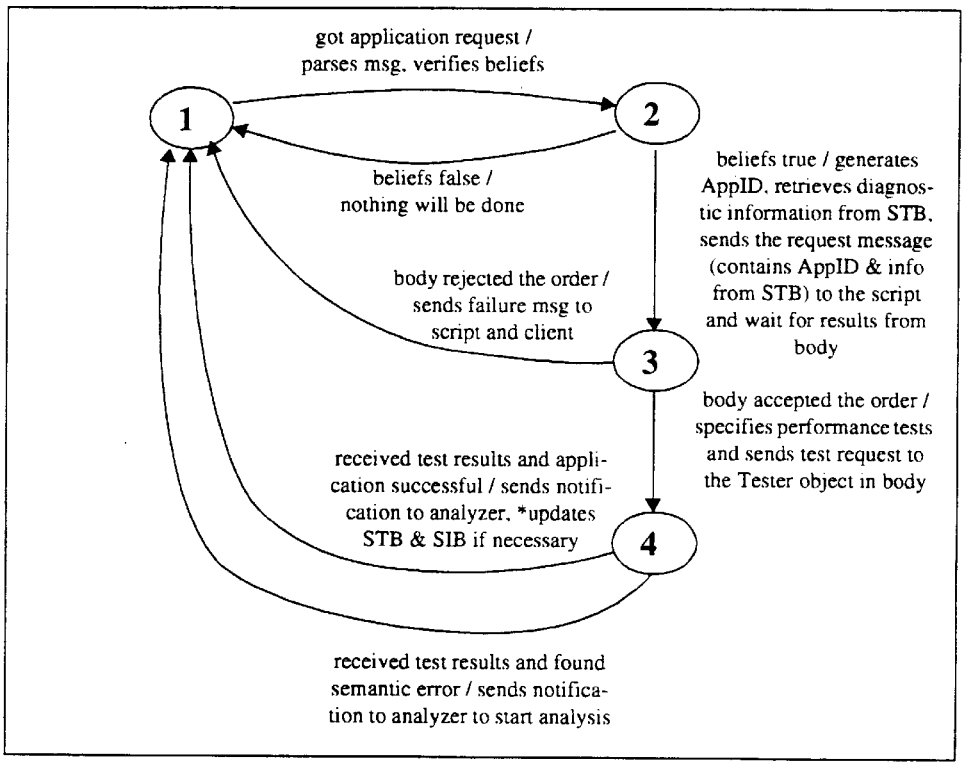

The finite state machines represented by FIGS. 16(a) and 16(b) demonstrate the behavior of a modified script and a watcher, respectively, in the application agent. The script has been simplified to have only three states in FIG. 16(a). The results or responses from the agent body are filtered by the watcher instead of being received by the script. If an

TABLE B

| Application | HelpDesk Agent ID | Script ID involved | Category | Type | Area Code | Phone # |
| --- | --- | --- | --- | --- | --- | --- |
| Voice Call 1 | VoiceCallAgent_1 | 001 | VoiceCall | long-distance | 416 | 123-4567 |
| Voice Call 2 | VoiceCallAgent_1 | 001 | VoiceCall | long-distance | 415 | 234-5678 |
| Voice Call 3 | VoiceCallAgent_1 | 001 | VoiceCall | long-distance | 852 | 345-6789 |
| Voice Call 4 | VoiceCallAgent_1 | 001 | VoiceCall | local | — | 456-7890 |
| Modem Call 1 | ModemCallAgent_1 | 001 | ModemCall | long-distance | 416 | 567-8901 |
| Modem Call 2 | ModemCallAgent_1 | 001 | ModemCall | long-distance | 415 | 678-9012 |

Table B shows four voice call applications and two modem data transfer applications. Five of them are applications using long distance phone service and one is a local call application. The identities of the agents responsible for voice call services and modem data transfer services are 'VoiceCallAgent_1' and 'ModemCallAgent_1' respectively. Both agents have their own script objects for different types of applications. In the example above, the voice agent has the script with ID '001' for all phone applications. Similarly, the modem agent has its own scripts. A function in the watcher uses this information to generate the AppIDs. The level of details or particularity can be adjusted so that an AppID can be used to represent a unique application or a group of similar applications. First of all, the details of the first application in the table can be expressed as an information string as follows:

'VoiceCallAgent_1-001-Type^long_distance-AreaCode^416-PhoneNum^12345678'.

Similarly, the details of the next application can be represented by:

'VoiceCallAgent_1-001-TypeAlong_distance-AreaCode^416-PhoneNum^2345678'.

However, in practice the detail level of the strings is reduced so that they can be used to describe a group of application is successful (i.e. passes all of the performance tests) the first time the watcher does nothing but wait for another job request. If a semantic error is identified in an application, the watcher notifies the analyzer to start analysis and generate Table A as discussed above. Hence, the next time an application with the same AppID is set up, the watcher will choose the next set of resources from the table stored in the STB and send the information to the underlying agents. The underlying agents can then choose resources accordingly based on the information provided. The diagnostic actions continue until an application with the same AppID is found to be successful or no more resources are available from the table. The system administrator can also apply a set of test applications (having the same AppID) to locate the fault. If all available resources under an agent have been tested but the application still has a semantic problem which is solved when the resources of another agent are employed, the semantic error detection system of the present invention concludes that the first agent is the faulty agent and updates the information in the same way.

Once an application has been proven successful, and the STB contains the diagnostic information of the application, and the watcher sends the notification to the analyzer. The analyzer then determines which resource has been replaced and considers it to be the source of the semantic error. If all underlying agents and resources attaching to an agent fail the application, the agent itself would be considered the faulty resource instead of the underlying agents/resources. The analyzer updates a "badlist" that holds a set of faulty resources of the application as well as update the SIB by sending information to the SIB Monitor. Finally, it clears the STB records of the application in order to save local memory space. By passing the badlist along with job request messages, the faulty resources can be avoided in the future.

The SEDO Information Base (SIB) is a global information base that stores information concerning all semantic errors encountered in an entire multi-agent system. The analyzer described above updates the SIB when the faulty resource is located. The system administrator can then use an interface, the SIB Monitor, to get information such as which performance test failed, the list of faulty resources, the simplified setup connection tree information (expressed in facts) and the detailed description of the application. The administrator can clear the SIB records at anytime to reset the system into the original state.

Similar to STB's the SIB uses key-value pairs to store information. It also uses the AppIDs as the keys and a SIBRecord object associated with each key. A SIBRecord contains the details of an application, setup connection tree, resource table, a list of resources suspected of causing semantic errors and a list of failed performance tests.

In the body of an application agent, a Tester object is created once a Broker object has passed all of the results to the head. It waits for the request from the watcher and starts testing the quality of service when it is asked to do so. If an application is successfully set up and the result is returned by underlying agents, the watcher issues performance test requests to check the overall performance. The Tester object starts testing the quality of service upon receiving the test request. Once the tests have finished and the results have been passed pack to the watcher, the Tester object is destroyed by the Broker object. When the test request arrives, the Tester object compares the requirement with the value measured, and then returns the results to the watcher. In the long distance service example discussed above, after the helpdesk agent connects to the phone port, a Tester object is created to measure the data transfer rate or the error rate. The behavior of the Tester object is shown in FIG. 17.

There are a number of performance tests and methodologies of capturing the results. For example, Quality Assurance Language (QuAL) is one of the methods to verify the end-to-end quality of service requirement in a Tester object in the voice/data transfer example (see P. G. S. Florissi, "QUAL: Quality Assurance Language", Technical Report CUCS-007-94, 1994). In the printer example discussed in the Background of Invention, a device may be connected to or internally built into each printer so that the image of a printout can be captured, returned to the caller and compared to the original image (e.g. applying OCR—Optical Character Recognition technology).

FIG. 18 shows operation of a modified Broker object according to the present invention in the agent body. Resource selection is dynamic in that it depends on the job order received from the head. If the job order message contains diagnostic information, the broker selects the resource accordingly. There are three pieces of diagnostic information included in each job request (order) message: SedoInfo, BadList and CallList.

SedoInfo is a set of resources selected from the table which is generated by the analyzer in the application. If it is a brand-new application or has always been a successful one in the past, SedoInfo will contain only a string value "none". In this case, the underlying agents will send the setup connection tree information to the analyzer. Otherwise, SedoInfo will contain some caller-callee pairs. The caller in a caller-callee pair is the ID of an agent appearing in the setup connection tree, where callee is the ID of one of the underlying agents or resources attaching to the caller agent. If an underlying agent finds that it matches the caller itself from SedoInfo, it will select the callee for the job in a higher priority, i.e. regardless of the rules or policies applied, as long as it is healthy.

When an agent connects to its underlying agents with the XOR pattern, it chooses only one of them and sends the job request to the chosen agent. Nevertheless, unselected agents may hide extra connection tree information beneath. In order to send the complete setup tree information to the analyzer, the agent sends a 'fake' job request message to all of the unselected agents. SedoInfo in a 'fake' job requests contains a string value "tree" so that the called agent will send only connection tree information to the analyzer and forward the 'fake' job requests to all its underlying agents. Hence the setup connection tree received by the analyzer is a complete representation.

Provided that Sedolnfo is "none" which has no diagnostic information, either the first available resource in the local resource list will be chosen or a preferred resource indicated by the job order from the agent head. The broker looks for another available resource if the resource is unhealthy. Nevertheless, if SedoInfo contains diagnostic information, an agent will not choose other available resources from the resource list even if the agent/resource specified by SedoInfo is found to be unhealthy. Instead, the broker replies with a message to the head that indicates a failed resource selection. The watcher then simply chooses the next set of resources from the table the next time a similar application is to be setup.

BadList is a list of semantic faulty agents or resources found by the algorithm according to this invention. An agent always ignores these agents or resources in the highest priority unless the badlist in the watcher of the application is reset by the SIB Monitor. Since each badlist is associated with an AppID, the agent/resource avoided from BadList information in an application may still be chosen by other applications with different AppIDs.

As discussed briefly above, CallList is a list of agents that are involved during the application setup. This information is useful for simplifying the LOOP pattern such that if an identical agent is called during a subsequent setup of the same application, it will find itself already on the list and will modify its ID to make itself look like another agent, as discussed above. This also applies to the caller of the repeated agents. An agent (the caller) may recognize that one of the agents in the Call List is the one which it is going to select. Hence it modifies the ID of the called agent the same way as the called agent does. Returning to the example of FIG. 11 the CallList information received by A1 initially is A0. Then A1 adds itself to the list and the new list is passed along with the job request to A3. A3 therefore receives the CallList information [A0,A1] and finds that A1—the agent it was going to call is already in the list. Accordingly, A1 is modified to A1##01 and this new ID is used in the setup connection tree information. A3 also puts itself on the list and hence the CallList information received by A1 at the next recurrence becomes [A0,A2,A3]. A1 realizes that it was called before and so uses A1##01 as its new ID for both the new CallList and the setup connection tree information. Thus, the new CallList becomes [A0,A2,A3,A1##01]. If A1 is called again later, the new CallList becomes [A0,A1,A3, A1##01, . . . A1##002, . . . ], and so on.

The modified broker in the application agent also creates a Tester object for application performance tests as discussed above.

Figure 19:
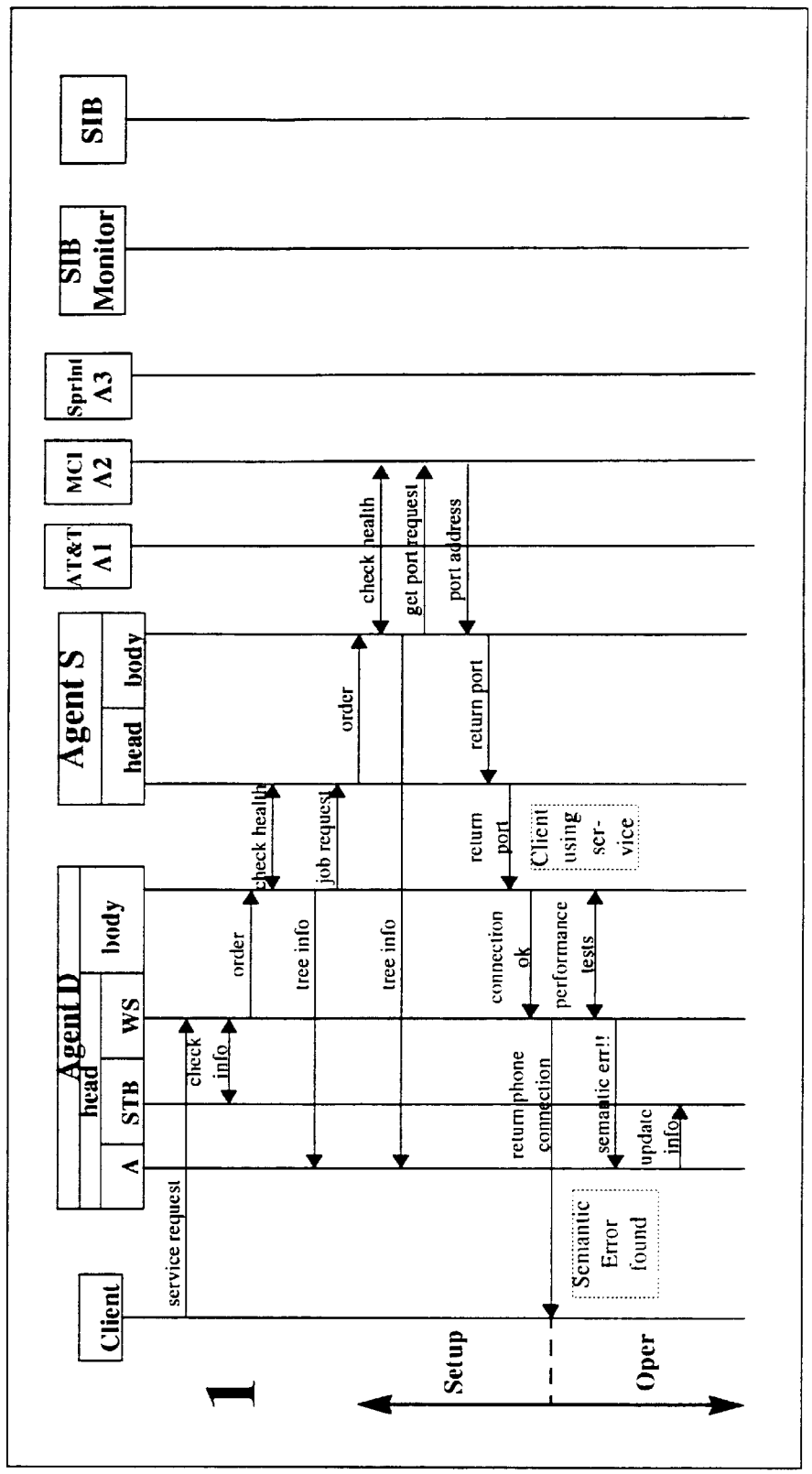
FIG. 19 is a message sequence chart showing messages exchanged between agents for the modem data transfer application of FIG. 1 using the system of the present invention.

An example is set forth below to better illustrate the principles of the present invention in identifying a semantic error in the long distance multi-agent service of FIG. 1. Assume that a client wants to send modem data to Washington. Since MCI (A2) offers the most economic price for long distance service to the U.S. based on the rules defined in the script of agent S, agent A2 is chosen for the application. However, in the fault scenario discussed above, MCI uses compressed trunks which leads to a semantic error on modem data transfer. FIG. 19 is a message sequence chart demonstrating how the agents behave during the setup and operation of the newly created modem data transfer to identify a semantic error application.

Figure 20:
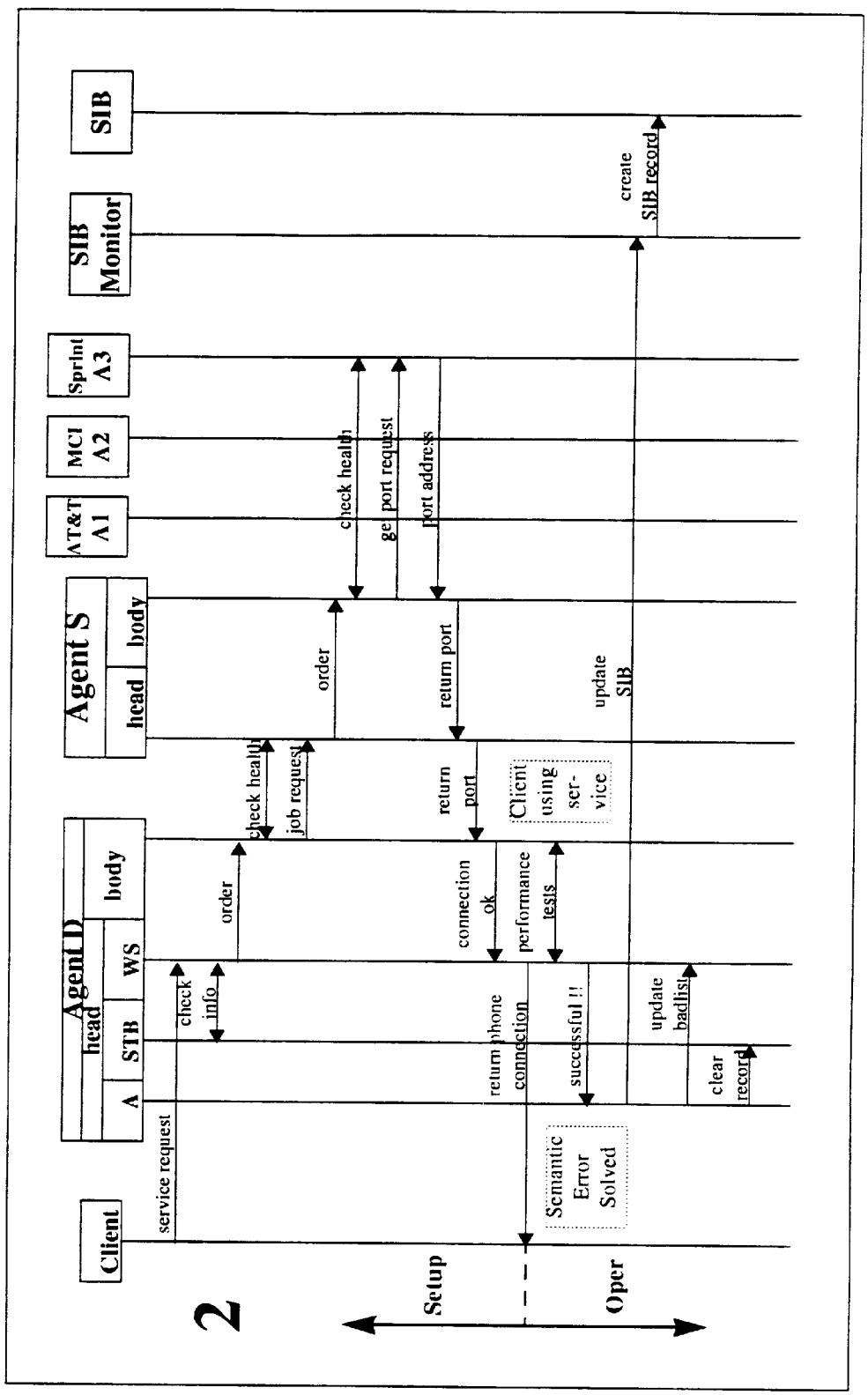
FIG. 20 is a message sequence chart showing messages exchanged between agents for a subsequent invocation of the modem data transfer application of FIG. 1 using the system of the present invention.

FIG. 20 shows the setup and operation of another client who subsequently asks for the modem data transfer service. The destination is again Washington. The watcher in agent D recognizes that it is an application having the same nature as the first one and hence retrieves information from the STB. The STB contains the table generated by the analyzer since the analyzer realized the occurrence of the semantic error in the first application and had finished the analysis process. The stored table is [[A2], [A3], [A1]]. The watcher sends the job request, including the SedoInfo information: [A3:S], to agent S which finds A3 (Sprint) from SedoInfo and chooses it instead of A2 (MCI). Since Sprint does not use a compressed trunk in the illustrative example, the application is a successful one. The 'watcher sends the notification of success to the analyzer which in turn updates the badlist in the watcher, sends detailed information to the SIB Monitor and clears the records of this application in the STB. The system administrator can then select one the of AppIDs from an AppIDs option window (not shown). The letter 'N' is provided just before an AppID (not shown in the Figures) that indicates a newly created SIB record which has not yet been examined. By clicking the AppId, 'N' is changed to the minus symbol '–' and all corresponding diagnostic information will be shown on fields 'Details', 'Setup Tree', 'Rsc Table', 'Failed Tests' and 'Suspect List' accordingly. In this simulation, the content of each field was as follows:

Details: "Root: ModemCallAgent_1(Real AgentID of agent D in simulation)
Script: 001
Type: long_distance
AreaCode: Washington"
SetupTree: A set of facts that represent the simplified tree information (not shown here)
RSC Table: [[MCI1], [Sprint1], [AT_T1]](Real AgentIDs for A2, A3 and A1 respectively)
Failed Tests: [TransferRate>14.3]
Suspect List: [MCI1]

In the event that Sprint also introduces a semantic problem to the application, the analyzer updates the suspect list in the SIB and the new suspect list becomes [MCI1, Sprint1]. In addition, the letter 'U' is appended before the AppID. The administrator can then determine that the existing diagnostic information of that AppID has been updated The information of the fields is not changed until the record has been cleared and the SIB Monitor can accept new information again.

When similar applications are set up in the future, agent S no longer chooses MCI since the information in Badlist contains [A2]. Instead it selects A3 (Sprint). New setup connection tree information is also sent to the analyzer and the new table becomes [[A3], [A1]]; The system administrator may select the AppID representing the application on the SIB Monitor and then press the 'clear' button to reset the application. The reset message is sent to the watcher to clear the badlist.

Although MCI is rejected by long-distance modem data applications in this case, other applications such as long distance voice call applications will still accept MCI since the AppIDs of the voice applications are different from those of the modem ones.

The preferred embodiment set forth in detail above utilizes a deterministic approach to identifying semantic errors in multi-agent systems. The invention avoids the faulty agents or resources once they are determined to be the sources of semantic problems. In some multi-agent systems, the understanding relationship between two agents is more complicated in that it contains 'trust' to determine whether the callee is the most trustworthy or reliable one to employ. Basically, 'trust' in a caller-callee pair in a job can be expressed as a quantitative value or magnitude that measures the trust the callee places in the caller for the job. For instance, in the application domain described in the long distance application above, the trust of agents A1, A2 and A3 in agent S is initially the same, say 1.0 for the modem data transfer application. All of these resources should have the same priority to get the job assuming that the head of agent S does not enforce its body to choose a preferred resource. However, after A2 has been found to the faulty resource, the system of the present invention will send the BadList information to be the underlying agents as before in the setup of a similar application, but the agent (S) that employees the faulty resource (A2) will have less trust in that resource and remove it from the local resource list. The difference is that if the other two agents (A1 and A3) are off-line or they have lower trust values later, the faulty resource (A2) can be re-selected. Hence "trust" can be treated as the probability of being successful based on past history (the statistics of success).

The components of a multi-agent system are often complicated and unstable in real applications. The overall performance of an application may vary depending on how busy the components involved are, how old the hardware components are, whether the hardware needs maintenance, and many other factors. A resource may have caused a semantic problem in only one special occasion before but works perfectly in other instances. Thus, it is contemplated that the principles of the present invention may be extended to a trust model such that the multi-agent system utilizes a pseudo-probabilistic approach to solving semantic problems (i.e. not a deterministic approach). This approach may be preferable for the dynamic behavior of a multiagent system. The drawback of this alternative approach is that the reaction of the system may not be fast enough to replace or eliminate the faulty resources in some life-critical situations. It is contemplated that a combination of both approaches may be implemented dynamically according to the needs of a particular application.

Alternative embodiments and future applications of the invention are contemplated. For example, the principle of pattern recognition may be extended to include patterns of XOR-Join or AND-Join, or some ORDER patterns which may affect the setup connection tree. In addition, a counter may be applied on the LOOP pattern so that the system can keep track of the number of physical cyclic connections in order to determine whether a logical infinite loop has occurred or merely a course of distinct tasks.

Further developments of the invention may include advanced artificial intelligence systems that have the capability to analyze the real causes of semantic problems based on the information provided by the SIB. The system can also be extended to adopt mobile agent technology so that mobile analyzers can be deployed to collect diagnostic information actively throughout the hierarchy of agents. Also, the analysis process (the most time consuming process) can be effected anywhere so that the system resources can be used more efficiently.

All such embodiments and extensions of the invention are believed to be within the sphere and scope set forth in the appended claims.

What is claimed is:

1. Apparatus for automatically locating sources of semantic error in a multi-agent system having an application agent with a head portion and a body portion for initiating an application in response to a service request and one or more underlying agents and resources for implementing said application, comprising:

a temporary database in the head portion of said application agent for storing diagnostic information; and a plurality of rule-based expert system scripts in the head portion of said application agent for receiving said service request and in response assigning an identity value to said application, retrieving diagnostic information from said temporary database for indicating whether said application as identified by said identity value has previously encountered a semantic error, and I) in the event said diagnostic information indicates that said application has not previously encountered any said semantic error, then a) issuing a job request via the body portion of said application agent to said underlying agents and resources along with said identity value and diagnostic information indicating that said application has not previously encountered any said semantic error, whereupon said underlying agents and resources return simplified setup connection tree information for said application as identified by said identity value, and b) initiating performance tests via the body portion of said application agent on said underlying agents and resources for detecting any said semantic error, and i) in the absence of detection of any said semantic error then updating said temporary database to indicate that said application as identified by said identity value has resulted in said absence of detection of said semantic error, and ii) in the event of detection of said semantic error then analyzing said simplified setup connection tree information and said performance tests to identify a predetermined one of said underlying agents and resources responsible for said semantic error and updating said diagnostic information in said temporary database in response thereto, and II) in the event said diagnostic information indicates that said application has previously encountered said semantic error then issuing said job request to said underlying agents and resources along with said diagnostic information via the body of said application agent whereby selection of said predetermined one or more of said underlying agents and resources responsible for said semantic error is avoided.

2. The apparatus of claim 1, wherein said simplified setup connection tree information further comprises a plurality of expert system facts expressed using only AND and XOR actions and wherein multiple calls to any single agent are indexed by means of a call list for identifying said multiple calls.

3. The apparatus of claim 2, wherein said plurality of rule-based expert system scripts further comprise:

at least one watcher script;

at least one analyzer script; and at least one modified script;

said watcher script being adapted to receive and parse said service request to verify beliefs of said watcher script and in the event said beliefs of said watcher script are false taking no further action and in the event said watcher script beliefs are true generating said identity value, retrieving said diagnostic information from said temporary database, and generating a request message including said identity value and said diagnostic information to said at least one modified script;

said modified script being adapted to receive and parse said request message to verify beliefs of said modified script and in the event said beliefs of said modified script are false then generating a failure message and in the event said beliefs of said modified script are true then issuing an order including said diagnostic information to the body portion of said application agent, whereupon said body portion either accepts said order or rejects said order;

said watcher script being further adapted to send a further failure message to said modified script in the event that said body portion rejects said order and to initiate said performance tests in the event that said body portion accepts said order whereupon said body portion returns results of said performance tests to said watcher script, and in the event said test results are successful then sending a success notification to said analyzer script and in the event said test results are not successful sending a failure notification to said analyzer script;

said analyzer script being adapted to receive from said underlying agents and resources said simplified setup connection tree information relating to said application as identified by said identity value and for receiving from said watcher script one of either said success notification or said failure notification and in the event of receipt of said success notification then updating said temporary database to indicate that said application as identified by said identity value has resulted in said absence of detection of said semantic error, and in the event of receipt of said failure notification executing an analysis process for analyzing said simplified setup connection tree information and said performance tests to identify said predetermined one of said underlying agents and resources responsible for said semantic error, updating a badlist of faulty agents and resources to include said predetermined one of said underlying agents and resources and then clearing said diagnostic information for said application in said temporary database.

4. The apparatus of claim 3, wherein said analyzer further comprises:

an analysis script for reducing said simplified setup connection tree information to a reduced tree in the form of a logical expression of relationship between said application agent and said resources;

a transformation function for transforming said reduced tree into a transformed list in disjunctive normal form; and a table generation function for generating a table of sets of selectable ones of said resources arranged in rows, wherein said rows are arranged in an order such that only one different resource appears between two neighboring rows of said table, and storing said table as diagnostic information in said temporary database.

5. The apparatus of claim 4, wherein said diagnostic information is stored in said temporary database in key-value pairs each comprising said identity value as a key and a record object as a value, said record object containing fields for storing said identity value, said simplified setup connection tree information, said table and a table pointer.

6. The apparatus of claim 5, wherein said performance tests each comprise a keyword for identifying test type, a conditional symbol and a threshold numerical value.

7. The apparatus of claim 6, further including a global information database maintained by said analyzer script for storing detailed information concerning semantic errors encountered in said multi-agent system.

8. The apparatus of claim 7, wherein said detailed information is stored in said global information database in key-value pairs each comprising details of each said application, said simplified setup connection tree information, said table, a list of said resources suspected of causing semantic errors and a list of failed ones of said performance tests.

9. The apparatus of claim 8, wherein said diagnostic information includes said badlist, said call list and an information list in the form of one of either a null string value in the event said application has not previously encountered any said semantic error, and a set of said resources selected from said table in the event said application has previously encountered said semantic error.

10. The apparatus of claim 9, wherein said set of said resources is arranged as a plurality of caller-callee pairs wherein each caller comprises said identity value of said application and said callee comprises a further identity value of one of said underlying agents.

11. The apparatus of claim 10, wherein the body portion of said application agent further comprises a tester object for testing quality of service of said underlying agents and resources upon initiation of said performance tests by said watcher script and in response returning said results of said performance tests to said watcher script.

12. The apparatus of claim 11, wherein said body portion further includes a modified broker object for receiving said order including said diagnostic information from said modified script and, in the event said information list contains said null string value, sends said simplified setup connection tree information to said analyzer script, creates said tester object and after said tested object has returned said results of said performance tests to said watcher script destroys said tester object, and in the event said information list does not contain said null string value then selects a healthy one of said resources based on information contained in said information list and said badlist.

13. The system of claim 1, wherein said rule-based expert system scripts are written in Java Expert System Shell.

14. A method for automatically locating sources of semantic error in a multi-agent system having an application agent with a head portion and a body portion for initiating an application in response to a service request and one or more underlying agents and resources for implementing said application, comprising the steps of:

receiving said service request;

assigning an identity value to said application;

retrieving diagnostic information from a temporary database for indicating whether said application as identified by said identity value has previously encountered a semantic error;

I) in the event said diagnostic information indicates that said application has not previously encountered any said semantic error, then a) issuing a job request via the body portion of said application agent to said underlying agents and resources along with said identity value and diagnostic information indicating that said application has not previously encountered any said semantic error, whereupon said underlying agents and resources return simplified setup connection tree information for said application as identified by said identity value, and b) initiating performance tests via the body portion of said application agent on said underlying agents and resources for detecting any said semantic error, and i) in the absence of detection of any said semantic error then updating said temporary database to indicate that said application as identified by said identity value has resulted in said absence of detection of said semantic error, and ii) in the event of detection of said semantic error then analyzing said simplified setup connection tree information and said performance tests to identify a predetermined one of said underlying agents and resources responsible for said semantic error and updating said diagnostic information in said temporary database in response thereto, and II) in the event said diagnostic information indicates that said application has previously encountered said semantic error then issuing said job request to said underlying agents and resources along with said diagnostic information via the body of said application agent whereby selection of said predetermined one or more of said underlying agents and resources responsible for said semantic error is avoided.

* * * * *